May 10, 1932.  A. C. MARSHALL  1,858,021
SHORE
Filed March 14, 1929
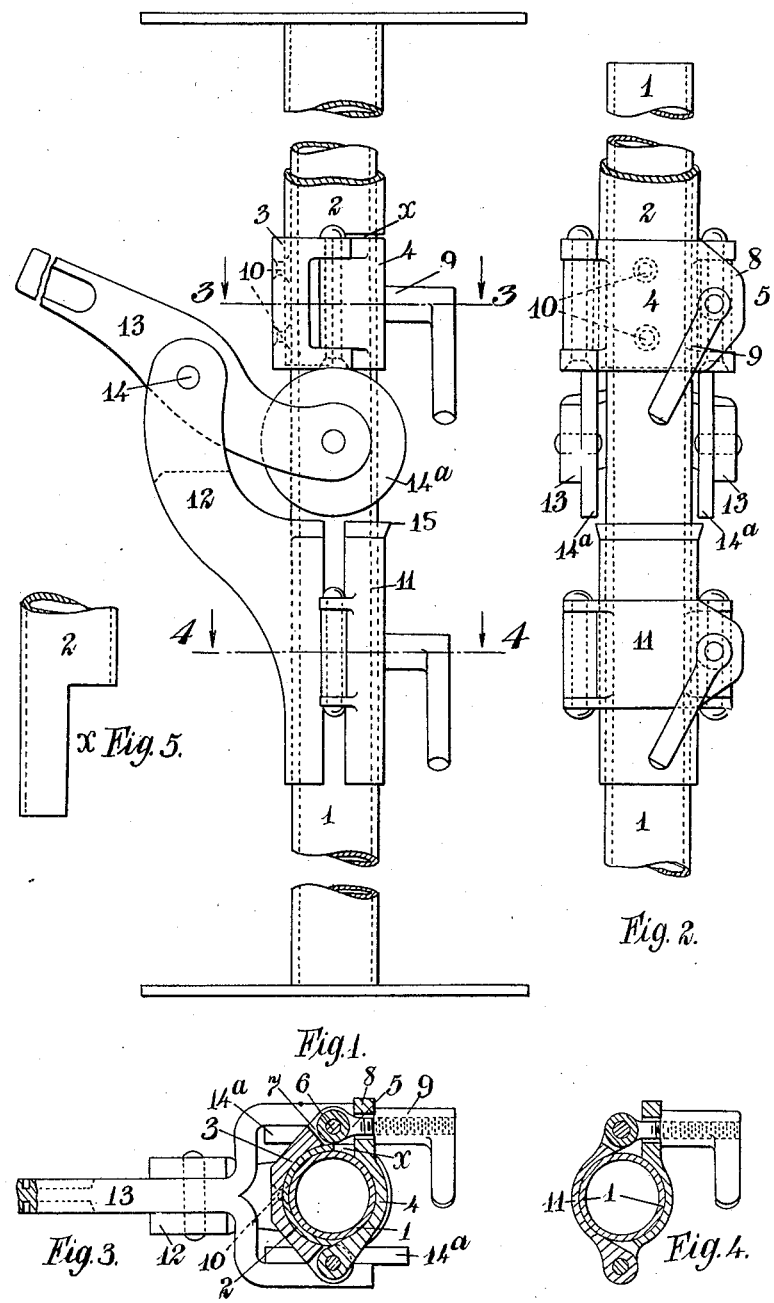
Inventor,
Arnold Clarence Marshall,
By his Att'y, Harold D. Penney Patented May 10, 1932

1,858,021

UNITED STATES PATENT OFFICE

ARNOLD CLARENCE MARSHALL, OF LONDON, ENGLAND, ASSIGNOR TO THE STEEL SCAFFOLDING COMPANY LIMITED, OF LONDON, ENGLAND, A CORPORATION OF GREAT BRITAIN

SHORE

Application filed March 14, 1929, Serial No. 346,929, and in Great Britain May 25, 1928.

This invention relates to improvements in pit-props, and similar supports, and it has for its object to provide means whereby the said prop or the like when placed in position may be readily extended so as to afford the desired support.

According to this invention the prop or the like comprises two members, one arranged to telescope within the other. Permanently secured in any suitable manner to one of the said members is a clip or clamp conveniently in the form of two hingedly connected suitably shaped members, of which one is secured by riveting or in any other manner to one member of the prop, the tube being cut away to enable the other or free member of the clip to bear upon the inner member. Provision is made whereby the free member of the clip may be caused to bear against the inner prop member in a manner such that the parts may be firmly secured together after the desired adjustment has been made.

Secured to the second member of the prop in a manner such as will permit of its ready removal is a second clip or clamp similar to that previously described and having arms or projections in which is pivotally mounted a lever having its inner end bifurcated to straddle the prop, and provided with rollers adapted to engage the inner or lower end of the clip upon the second member.

In order that the invention may be the better understood drawings are appended in which:—

Fig. 1 is a side view of a pit-prop embodying the present invention.

Fig. 2 is a rear view.

Fig. 3 is a section on line 3—3 Fig. 1.

Fig. 4 is a section on line 4—4 Fig. 1.

Fig. 5 is a view showing certain details.

Referring to the appended drawings 1 and 2 indicate tubular bodies of which the lower 1, telescopes within the upper 2. Secured to the lower end of the upper member 2 is a clamp formed of two hingedly connected parts indicated respectively by 3 and 4, said parts being held in their effective position by means of an eye bolt 5, mounted upon a pin 6 passing through lugs 7 upon the part 3 of the clamp, said bolt passing through a perforation in a lug 8 upon the other part 4 and having engaging it a nut 9 whereby the two parts may be drawn together. The tubular member 2 is cut away upon one side as shown more clearly at $x$ Fig. 5 providing an opening through which the part 4 may be caused to bear against the tube 1 as will be hereafter more fully explained. The part 3 of the clamp is secured to the uncut portion of the tube 2 by means of rivets 10 indicated by dotted lines in Figs. 1, 2 and 3.

11 indicates a clamp of substantially the same construction as that just above described and applied to the part 1. In this case however the clamp is provided with an upwardly extending arm or bracket 12, bifurcated to accommodate a lever 13 pivotally mounted on said bracket by means of a pin 14. The lever at its inner end is bifurcated straddling the part 1 as shown and provided with rollers 14$^a$ disposed one on each side of said part. The rollers just referred to when the outer end of the lever is depressed engage the lower end of the clamp upon the part 2 of the prop and act to force same upwards. In order to provide a sufficient surface of engagement for the rollers projections may be provided upon the lower end of the clamp. Similar projections indicated by 15 may be provided upon the upper end of the lever carrying clamp 11 to engage the rollers and so limit the upward movement of the lever when the pressure thereon is removed.

In practice the free member of the upper clamp is loosely engaged with the inner telescopic member until the lever has been actuated to extend the prop and whilst the pressure is still applied the nut 9 upon the bolt 5 is tightened and the free part of the clamp is forced against the exposed surface of the part 1 of the prop, whereby the parts 1 and 2 are firmly secured against relative longitudinal movement. The second clamp may then be removed and is free for further service.

Obviously instead of forming the telescopic member of the prop or the like of tube, it may be solid and further the second member of the prop may be partly solid.

I claim:

1. A prop comprising a tubular member, a second member slidable therein, an opening in the wall of said first member, a clamp secured to said first member, one element of which clamp engages the second member through the opening in said first member, a detachable clamp upon the second member and a lever mounted upon said clamp engaging the clamp of the first member.

2. A prop comprising a tubular member, a second tubular member slidable in said first member, an opening in the wall of said first member at the inner end thereof, a clamp comprising two hingedly connected members, means permanently connecting one of said clamp members to the first tubular member adjacent the opening therein, means for forcing the second clamp member into engagement with the second tubular member through said opening, a clamp detachably mounted upon said second tubular member, a bracket upon said last mentioned clamp, a lever having a bifurcated end mounted upon said bracket and rollers upon the ends of said bifurcations to engage the clamp upon the first member at diametrically opposite points at the inner end thereof.

3. A device of the character described comprising a telescoping member provided with a cut-out portion, a telescoped member slidable within said telescoping member, clamping means secured to said telescoping member for releasably locking said telescoping and telescoped members together, a second clamping means secured to the telescoped member, and means associated with said second clamping means for adjusting the total length of both telescoping and telescoped members.

4. A device of the character described comprising a telescoping member provided with a cut-out portion, a telescoped member slidable within said telescoping member, clamping means fixedly secured to said telescoping member for releasably locking said telescoping and telescoped members together, a second clamping means detachably secured to the telescoped member, and means associated with said second clamping means for adjusting the total length of both telescoping and telescoped members.

In testimony whereof I have hereunto set my hand.

ARNOLD CLARENCE MARSHALL.